Figure 1:
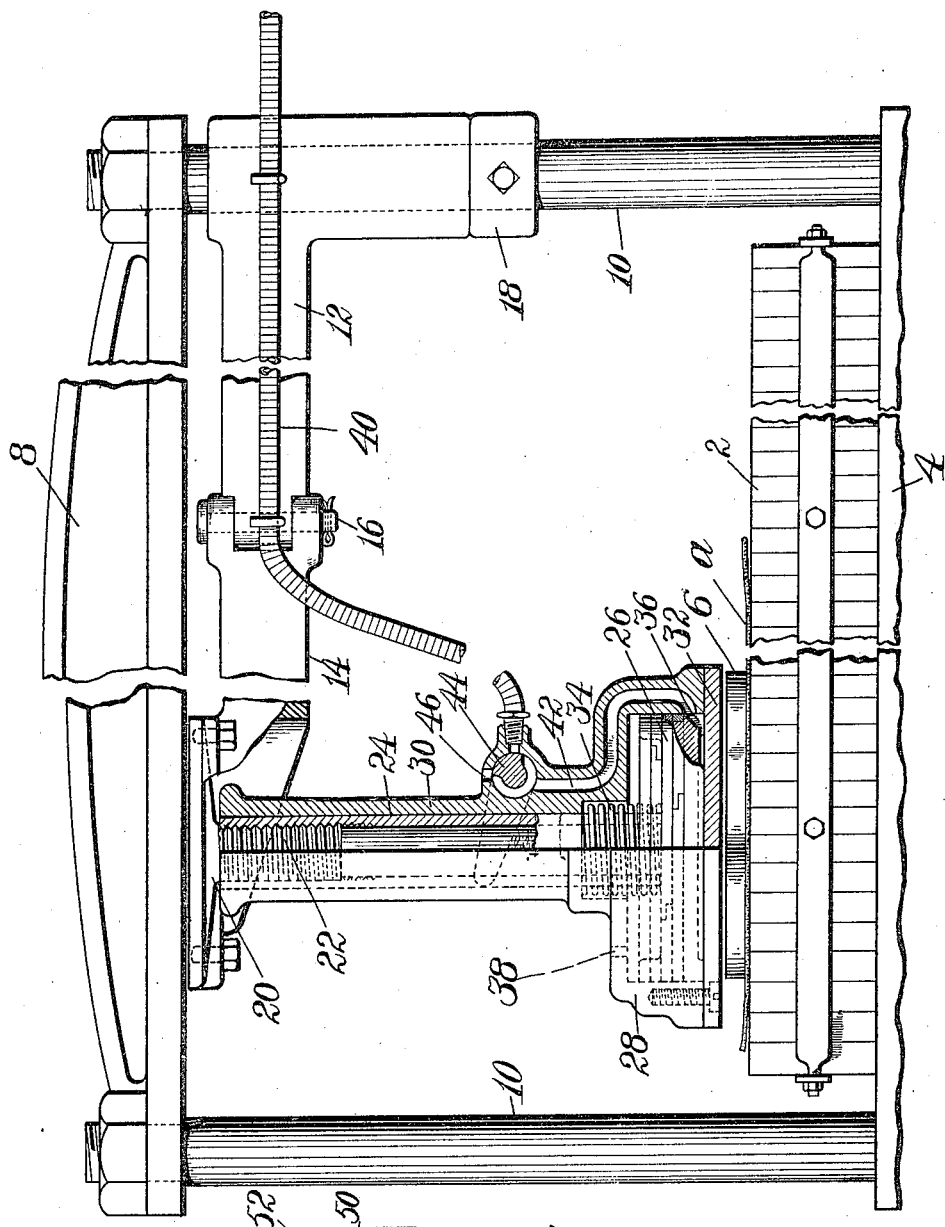

R. F. McFEELY.
MACHINE FOR CUTTING SHEET MATERIAL.
APPLICATION FILED FEB. 7, 1917.

1,317,716.

Patented Oct. 7, 1919.

INVENTOR-
Ronald F. McFeely
By his Attorney
Nelson M. Howard

UNITED STATES PATENT OFFICE.

RONALD F. McFEELY, OF BEVERLY, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

MACHINE FOR CUTTING SHEET MATERIAL.

1,317,716.      Specification of Letters Patent.      Patented Oct. 7, 1919.

Application filed February 7, 1917. Serial No. 147,193.

*To all whom it may concern:*

Be it known that I, RONALD F. McFEELY, a citizen of the United States, residing at Beverly, in the county of Essex and State of Massachusetts, have invented certain Improvements in Machines for Cutting Sheet Material, of which the following description, in connection with the accompanying drawings, is a specification, like reference characters on the drawings indicating like parts in the several figures.

This invention relates to machines for cutting sheet material, and more particularly to machines for cutting articles from sheet material by means of dies. In some aspects the invention is of particular utility for dieing out blanks from relatively thin sheet material such as upper stock for use in the manufacture of boots and shoes, and a construction particularly adapted for such use is herein shown for purposes of illustration; but it should be understood that the invention is not thus restricted in utility but is broadly applicable to various uses.

Objects of the invention are to provide an improved machine of the type in which the die operating means is movable relatively to the cutting bed to afford the operator an unobstructed view of the stock in placing the die; and to provide a machine of this type in which the movable parts may be comparatively light in construction without detracting from the efficiency of the machine, thus permitting the die operating means to be readily and quickly moved from one position to another and rendering the machine practical in operation not only for dieing out the usual vamps and quarters of shoe uppers from sheets of material, but also for cutting smaller pieces such as backstays or other stays or inserts used in the upper or the lining, which are frequently cut from scrap material and have been usually produced heretofore by striking the comparatively small dies by means of a mallet. A further object is to provide a machine in which comparatively wide material, such as cloth which is used for shoe linings, may be supported throughout its full width upon the cutting bed and in which the die may be effectively operated in any position on the bed.

To the above and other ends, the invention provides a machine in which a cutting bed and an abutment are arranged in opposed relation and in which die operating means is movable to different positions between the bed and the abutment and is so arranged relatively to the abutment as to cause the abutment to receive the counter thrust of said means in the dieing-out operation; and an important feature of the invention resides in a novel construction and arrangement of said means and abutment for the accomplishment of the objects in view. In the construction herein shown the die operating means is movable relatively to the abutment in all directions parallel to the working face of the cutting bed, and the abutment is rigidly supported at opposite ends, thus rendering the die operating means effective over as wide an area of stock as may be desired while insuring a positive clean cut of the die over any portion of the bed.

In accordance with a further feature of the invention fluid operated means of novel construction is provided for forcing the die through the stock. The illustrative construction comprises a cylinder, valve controlled means for admitting compressed air to the cylinder, and a piston within the cylinder held substantially stationary during the dieing-out operation while the cylinder moves to strike the die. The invention also provides mechanism for supporting the die operating means in such manner as to permit said means to be readily and quickly moved to a position over any portion of the stock on the cutting bed.

The above and other features of the invention will now be more particularly described with reference to the accompanying drawings and pointed out in the claims.

Figure 2:
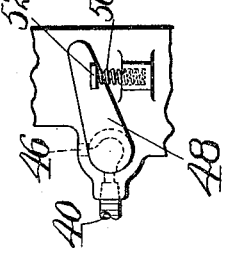

In the drawings:

Figure 1 is a view in rear elevation of the head portion of a machine in which the invention is embodied, a portion of the structure being shown in vertical section, and Fig. 2 shows in detail the means for controlling the admission of fluid to the die operating means, as viewed from the front of the machine.

The machine is provided with a cutting bed 2 which may have any desired construction and is shown as a sectional wooden block of a well known type, the block being supported upon a frame or base 4. The block is adapted to receive a sheet of stock upon its upper or working face, and dies of different shapes and sizes for producing the required blanks are positioned in turn upon different portions of the sheet and forced through the stock to cut out the blanks, the particular die selected for each operation and its location on the sheet depending upon the judgment of the operator who has in view the utilization of the stock with as little waste as possible. In the drawings a die 6 is shown in position for cutting a blank from a sheet of stock a.

Extending over the block 2 is a beam 8 constituting in the illustrative machine, an abutment which is secured rigidly at its opposite ends to rods 10 extending upwardly from the base 4. There are preferably four of these supports 10, one for each corner of the beam. Mounted to swing about a vertical axis at one side of the block is a support for the die operating means hereinafter to be described. This support comprises an arm consisting of two sections 12 and 14 hinged together by a pin 16 parallel to the axis of support of the arm, the section 12 being mounted conveniently to swing about one of the rods 10 and resting upon a collar 18 secured to the rod. Bolted to the portion 14 of the arm is a casting 20 having a depending shank 22 which is screw-threaded for engagement in the upper end of a hollow piston rod 24 on the lower end of which is rigidly mounted a piston 26. Surrounding the piston 26 is a cylinder 28, the cylinder being provided with an upwardly extending sleeve 30 which is slidable lengthwise on the piston rod 24. A cap 32 closes the lower end of the cylinder 28, and a spring 34 positioned between the piston 26 and a shoulder on the sleeve 30 serves to maintain the cylinder normally in its uppermost position determined by engagement of the cap 32 with the piston. The piston has a central depression in its lower end to provide at all times a chamber for the reception of the operating fluid, and the piston is cut away, as shown at 36, to admit the fluid to this chamber when the cylinder is in its uppermost position. Atmospheric pressure is maintained in the cylinder 28 above the piston 26 through the provision of a port or ports 38.

Operating fluid such as compressed air is conducted to the cylinder 28 through a flexible conduit 40 supported upon the arm section 12 and connected for communication with a passage 42 in the cylinder which opens into the lower end portion of the cylinder at a point which is opposite to the port 36 in the piston when the cylinder is positioned as shown. Communication between the conduit 40 and the passage 42 is controlled by a rotary valve 44 which also controls communication between the passage 42 and an exhaust port 46. The valve 44 is provided with a handle 48 in position for convenient manipulation by the operator, and a spring 50 engaging a lug 52 on the handle serves to position the valve normally as shown with the lower end portion of the cylinder in communication with the atmosphere.

It will be evident that the support for the pneumatic die operating means permits said means to be swung in any direction parallel to the working face of the cutting block to position the cylinder 28 directly over a die wherever the die may be located on the stock, as well as to position said means at one side of the block when an unobstructed view of the stock is desired. Such swinging movement may conveniently be effected by grasping the valve controlling handle 48 on the sleeve 30. After the cylinder has been thus positioned over the die, the operator depresses the handle 48 to admit operating fluid, such as compressed air, from the source of supply to the lower end of the cylinder, and the pressure and expansion of the fluid will immediately force the cylinder downward against the pressure of the spring 34 and cause the cap 32 on the lower end of the cylinder to strike the die and force it through the stock. In order to oppose a positive and effective resistance to upward movement of the piston 26 under the pressure of the operating fluid, the casting 20 on the arm section 14 is positioned as close as possible, consistent with clearance in its lateral movement, to the plane lower face of the beam 8, thus permitting it to engage the beam upon a slight upward spring of the supporting arm or in consequence of a slight movement of the arm sections on their bearings. The beam 8 will thus receive the counter thrust of the piston, and since the beam is rigidly supported at its opposite ends it will oppose effective resistance to movement of the piston in any location of the cylinder 28 over the block. The lower face of the beam 8 is sufficiently extended to permit the member 20 to be seated squarely against it in the operation of the die on any portion of the working face of the cutting block; and the member 20 also is provided with an extended plane upper face for engagement with the lower face of the beam, thus insuring a substantially perpendicular relation of the piston rod 24 to the working face of the cutting block and consequently a parallel relation of the die engagement plate 32 to the upper edge of the die in the dieing-out operation. All portions of the cutting edge of the die will therefore be forced evenly through the stock and a clean cut insured. Movement of the cylinder toward the cutting block will be limited by engagement of the cylinder with the upper end of the piston 26, and the dimensions of the cylinder and the piston are so proportioned as to permit the cylinder to force the die through the stock without causing the edge of the die to be driven into the block to such a distance as to render it difficult to remove the die or to mar unduly the surface of the block. For dies of different heights the normal distance of the cylinder 28 above the block may be varied by adjusting the piston rod 24 on the threaded shank 22.

After the die has been operated as above described, the operator permits the spring 50 to turn the handle 48 upwardly to open the exhaust port 46, thus permitting the operating fluid to escape from the cylinder and the cylinder to be returned to its initial position by the action of the spring 34. The cylinder is then swung to one side to permit the sheet of stock to be inspected and the die to be placed for the next cutting operation. It will be understood that the beam 8 is positioned at a sufficient height above the cuting block to prevent it from interfering in any material degree with the operator's view of the stock.

It will be evident that the machine herein shown and described is not necessarily restricted to the use of compressed air as an operating fluid, although an expansible fluid is preferable for the sake of rapidity in the operation of the machine, and the term "pneumatic" is accordingly used herein in a broadly inclusive sense. It will be evident, moreover, that in its broader aspects the invention presents features which may be employed with advantage in dieing-out machines irrespective of the particular character of the die operating means positioned between the abutment and the cutting block, although for simplicity and convenience pneumatic means such as shown is regarded as preferable.

Having described the invention, what I claim as new and desire to secure by Letters Patent of the United States is:

1. In a machine of the class described, the combination with a cutting bed, of an abutment extending over the bed, and die operating means movable between the bed and the abutment and relatively to the abutment in all directions substantially parallel to the working face of the bed, the die operating means being arranged with relation to said abutment to cause the abutment to receive the counter thrust of said means in the dieing-out operation.

2. In a machine of the class described, the combination with a cutting bed, of an abutment extending over the bed, and die operating means supported independently of the abutment at one side of the bed and freely movable between the bed and the abutment to different positions over the bed, the die operating means being arranged with relation to said abutment to cause the abutment to receive the counter thrust of said means in the dieing-out operation.

3. In a machine of the class described, the combination with a cutting bed, of a stationary abutment extending over the bed and rigidly supported at its opposite ends, and die operating means freely movable between the bed and the abutment to different positions over the bed, said means comprising relatively movable portions one arranged to engage said abutment to cause the abutment to receive the counter thrust and the other to engage a die on the bed in the dieing-out operation.

4. In a machine of the class described, the combination with a cutting bed, of a stationary abutment extending over the bed and co-extensive therewith, and pneumatic die operating means movable between the bed and the abutment to different positions over the bed, the die operating means being arranged with relation to said abutment to cause the abutment to receive the counter thrust of said means in the dieing-out operation.

5. In a machine of the class described, the combination with a cutting bed, of an abutment extending over the bed and rigidly supported at its opposite ends, said abutment having a lower face parallel to the working face of the bed, and pneumatic die operating means freely movable between the bed and the abutment in all directions parallel to the working face of the bed, said means comprising relatively movable portions one arranged to engage the lower face of the abutment and the other to engage a die on the bed.

6. In a machine of the class described, the combination with a cutting bed, of pneumatic die operating means movable into operative relation to different portions of the bed, and a support for said means comprising an arm pivoted at one side of the bed and provided with relatively movable parts, the construction being such that said means may be moved to an operative position with relation to any portion of the working face of the bed.

7. In a machine of the class described, the combination with a cutting bed, of an abutment extending over the bed, pneumatic die operating means movable between the bed and said abutment and arranged with relation to the abutment to cause the abutment to receive the counter thrust of said means in the dieing-out operation, and a support for said die operating means comprising a pivoted and jointed arm arranged to permit said means to assume an operative relation to any portion of the working face of the bed.

8. In a machine of the class described, the combination with a cutting bed, of pneumatic die operating means movable to different positions over the bed, said means comprising a cylinder and a piston in the cylinder, the cylinder being movable relatively to the piston and having means for engaging a die on the bed.

9. In a machine of the class described, the combination with a cutting bed, of pneumatic die operating means and a support therefor movable to permit said means to assume an operative relation to different portions of the working face of the bed, said means comprising a piston fixedly connected to said support and a cylinder movable relatively to the piston and constructed to engage a die on the bed.

10. In a machine of the class described, the combination with a cutting bed, of an arm pivoted to swing in a plane parallel to the working face of the bed and comprising two portions hinged together for relative movement in said plane, and pneumatic die operating means carried by said arm, said means comprising a piston rigidly connected to the arm and a cylinder movable relatively to the piston and constructed to engage a die on the bed.

11. In a machine of the class described, the combination with a cutting bed, of an abutment extending over the bed and coextensive therewith, and pneumatic die operating means movable between the bed and said abutment into operative relation to different portions of the working face of the bed, said means comprising a piston, a member connected to the piston in position to engage said abutment, and a cylinder movable relatively to the piston and constructed to engage a die on the bed.

12. In a machine of the class described, the combination with a cutting bed, of a stationary abutment extending over the bed and having a lower face substantially parallel to the working face of the bed and coextensive therewith, and pneumatic die operating means movable between said bed and abutment into operative relation to different portions of the working face of the bed, said means comprising a piston, a member secured to said piston and having an extended face opposed to the lower face of the abutment, and a cylinder movable relatively to the piston and constructed to engage a die on the bed.

13. In a machine of the class described, the combination with a cutting bed, of a stationary abutment extending over the bed, an arm mounted to swing between said block and abutment in substantially parallel relation to the working face of the bed, and pneumatic die operating means carried by said arm, said means comprising a piston secured to the arm, a cylinder movable relatively to the piston for operating a die, and a spring for normally maintaining the cylinder in an upraised position.

14. In a machine of the class described, the combination with a cutting bed, of an abutment extending over the bed, an arm mounted to swing between said bed and abutment in substantially parallel relation to the working face of the bed, a cylinder and a piston carried by said arm, means for admitting fluid to said cylinder for effecting a dieing-out operation, and means carried by said arm for engaging the abutment to oppose the counter thrust in the dieing-out operation.

15. In a machine of the class described, the combination with a cutting bed, of an abutment extending over the bed, an arm mounted to swing between said bed and abutment in substantially parallel relation to the working face of the bed, a contact member carried by said arm in close relation to the lower face of said abutment to permit said member to engage the abutment and oppose the counter thrust in the dieing-out operation, a cylinder and a piston also carried by said arm, and means for admitting fluid to the cylinder for effecting relative movement of said cylinder and piston to operate a die.

16. In a machine of the class described, the combination with a cutting bed, of an abutment extending over the bed, an arm mounted to swing between said bed and abutment in substantially parallel relation to the working face of the bed, a contact member carried by said arm and having an extended face in close relation to the lower face of said abutment to permit said member to engage the abutment and oppose the counter thrust in the dieing-out operation, a piston rigidly supported on said arm, and a cylinder carried by the arm and movable relatively to said piston for operating a die.

17. In a machine of the class described, the combination with a cutting bed, of an abutment having a plane lower face extending over substantially all portions of the working face of the bed, an arm movable between said bed and abutment in parallel relation to the working face of the bed, a piston and a cylinder carried by said arm and relatively movable to operate a die on the bed, one of said relatively movable parts having a plane die engaging face, and a thrust member mounted on said arm in position to engage the lower face of the abutment and determine a position of said die engaging face parallel to the working face of the bed in the dieing-out operation on any portion of the bed.

18. In a machine of the class described, the combination with a cutting bed, of a stationary abutment having a plane lower face parallel to the working face of the bed, an arm movable between said bed and abutment in parallel relation to the working face of the bed, a piston and a cylinder carried by said arm and relatively movable to operate a die on the bed, one of said relatively movable parts having a plane die engaging face, and a thrust member mounted on said arm and having an extended plane face in position to engage the lower face of said abutment and determine a position of said die engaging face parallel to the working face of the bed in the dieing-out operation on any portion of the bed.

19. In a machine of the class described, the combination with a cutting bed, of a stationary abutment extending across the bed, and die operating means movable between the bed and the abutment and relatively to the abutment in all directions in the horizontal plane above the bed and arranged with relation to said abutment to cause the abutment to receive the counter thrust of said means in the dieing-out operation, the abutment being positioned at such a height above the bed as to afford the operator an unobstructed view of all portions of the stock on the bed in placing the die.

20. In a machine of the class described, the combination with a cutting bed, of a stationary abutment extending across the bed and rigidly supported at its opposite ends, and die operating means freely movable between the bed and the abutment into position over a die on any portion of the working face of the bed and also movable laterally from any position over the bed, said means being arranged with relation to the abutment to cause the abutment to receive the counter thrust of said means in the dieing-out operation, and the abutment being positioned at such a height above the bed as to afford the operator an unobstructed view of all portions of the stock on the bed in placing the die.

In testimony whereof I have signed my name to this specification.

RONALD F. McFEELY.

Copies of this patent may be obtained for five cents each, by addressing the "Commissioner of Patents, Washington, D. C."